United States Patent

[11] 3,584,309

[72] Inventor Alexander M. Nicolson
 Concord, Mass.
[21] Appl. No. 844,021
[22] Filed July 23, 1969
[45] Patented June 8, 1971
[73] Assignee Sperry Rand Corporation

[54] METHOD AND MEANS FOR COMPENSATING AMPLITUDE AND TIME DRIFTS IN SAMPLED WAVEFORM SYSTEMS
 12 Claims, 3 Drawing Figs.

[52] U.S. Cl. .................................................. 328/155,
 307/238, 307/243, 328/135, 328/151
[51] Int. Cl. ....................................................... H03b 3/04
[50] Field of Search ......................................... 307/238,
 243; 328/135, 151, 155

[56] References Cited
UNITED STATES PATENTS
| | | | |
|---|---|---|---|
| 3,334,298 | 8/1967 | Monrad-Krohn............. | 328/135X |
| 3,364,466 | 1/1968 | Stine ............................ | 328/151X |
| 3,368,036 | 2/1968 | Carter et al.................. | 328/133X |

Primary Examiner—John S. Heyman
Assistant Examiner—R. C. Woodbridge
Attorney—S. C. Yeaton ABSTRACT: Method and means for compensating amplitude and time drifts in sampled waveform systems utilizing a nonsequential scanning pattern of the sampling gate thereby achieving long term averaging for noise reduction. A first sample of the magnitude of the waveform is obtained at a sampling time established with respect to a time base synchronized to the waveform, which sample is taken on a portion of the waveform having zero slope. A second sample thereof is obtained with respect to the time base on a portion of the waveform having a slope of relatively large magnitude with respect to zero slope. The difference between the magnitudes of the waveform obtained during the two sampling times is stored thereby providing a reference by which subsequently occurring time drifts may be compensated. Prior to obtaining each subsequent sample of the waveform, samples are obtained at the two reference sampling times and the difference is obtained between the magnitudes sampled thereat and compared to the stored reference. The error signal provided thereby is utilized to compensate the sampling time of the subsequent sample for time drift. The subsequent sample is compensated for amplitude drift by subtracting the magnitude of the waveform obtained at the zero slope reference sampling time from the magnitude obtained during the subsequent sampling time. The timing drift error signal obtained is also utilized to compensate the two reference sampling times when obtaining subsequent reference samples of the waveform.

INVENTOR
ALEXANDER M. NICOLSON
BY
*H P Terry*
ATTORNEY

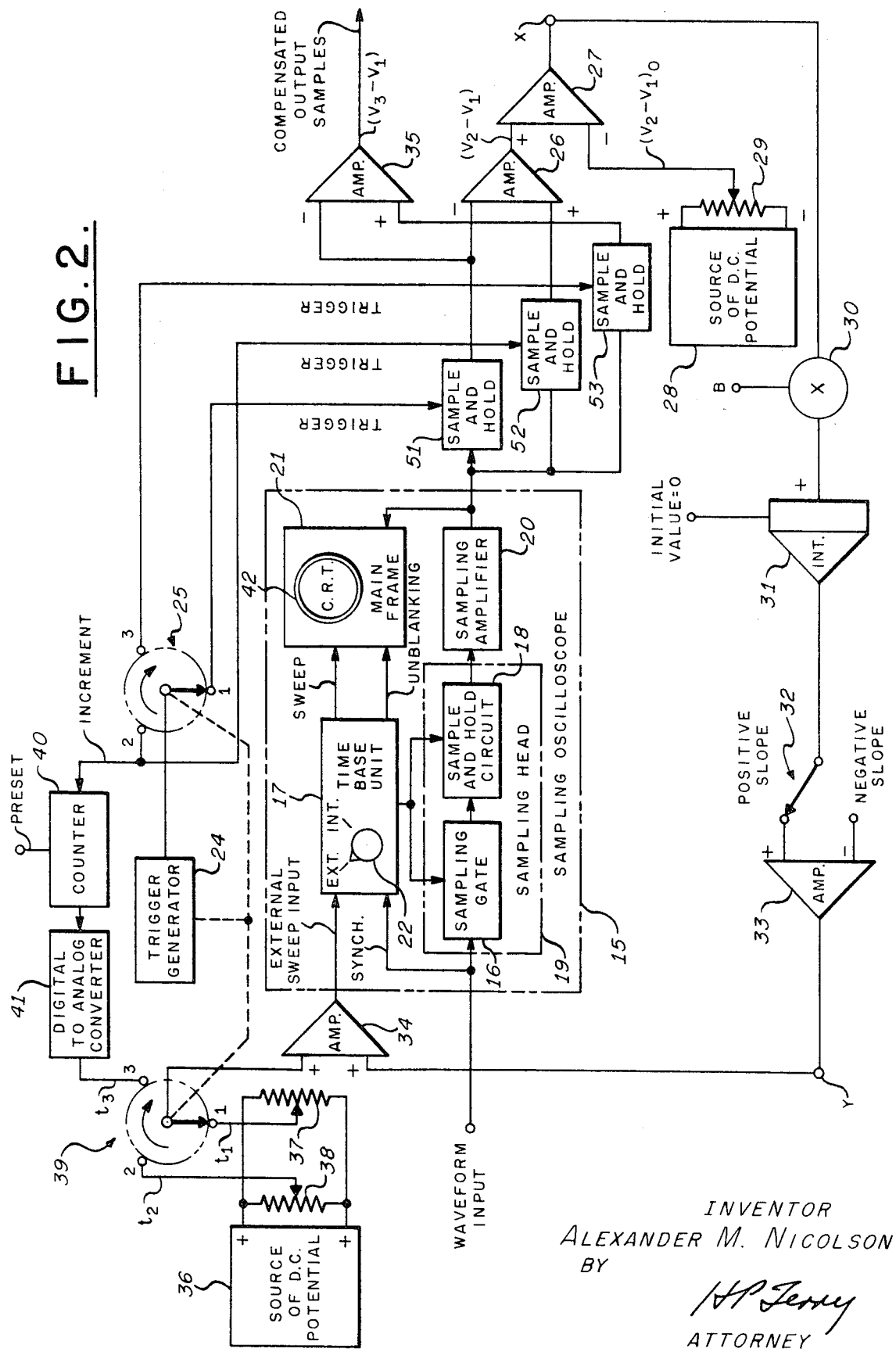

METHOD AND MEANS FOR COMPENSATING AMPLITUDE AND TIME DRIFTS IN SAMPLED WAVEFORM SYSTEMS

The invention herein described was made in the course of or under a contract or subcontract thereunder with the Department of the Air Force.

BACKGROUND OF THE INVENTION

1. Field of the Invention

The present invention pertains to waveform measuring or displaying systems utilizing sampling techniques.

2. Description of the Prior Art

Sampled waveform systems, such as sampling oscilloscopy systems, are known wherein a sampling gate is scanned continuously across successive repetitions of a repetitive waveform and is then returned to an initial position to repeat the scan thereof. Short term random fluctuations with respect to the amplitude and timing of the waveform, which fluctuations often obscure the shape thereof, may be reduced by taking repeated scans of the waveform thereby averaging the random fluctuation signals to zero. Long term amplitude and timing drifts of the system may, however, prevent proper averaging of the random short term fluctuations by imparting a non-zero long term mean to the fluctuation signals. Consequently, measured values of the waveform may be inaccurate or the shape of the displayed waveform may be indefinitely defined.

The long term amplitude drift may be caused by the high gain wideband amplification circuits required in waveform sampling systems having wide bandwidth characteristics. The long term timing drift may ordinarily be caused by drift in the precise time referencing circuits required in a sampling system which may display or measure repetitive waveforms having fractional nanosecond periods.

Long term amplitude and timing drifts of the type described cannot conveniently be reduced by conventional filtering techniques. For example, techniques such as chopping are inapplicable because of the bandwidths of the waveforms involved.

Prior art sampled waveform systems therefore are limited to the measurement or display of waveforms having nominally high signal to noise ratios and rise times greater than several hundred picoseconds. Prior to the present invention, for example, the shape of response characteristics of experimental circuits in electrically noisy systems often could not be determined at low signal levels utilizing conventional sampled waveform systems of the type described.

SUMMARY OF THE INVENTION

The present invention provides a method and means to compensate for long term amplitude and time drifts in sampled waveform systems thereby permitting long term averaging of repetitive waveforms. Thus, a reduction in random noise fluctuations is achieved. The invention comprises obtaining a first sample of the magnitude of the waveform at a sampling time established with respect to a time base synchronized to the waveform, which sample is taken on a portion of the waveform having zero slope. The magnitude of the sample obtained on this zero slope portion of the waveform is substantially unaffected by timing drifts of the system. The magnitude is, however, affected by the amplitude drifts of the system.

A second sample of the waveform is obtained with respect to the time base on a portion of the waveform having a slope of relatively large magnitude with respect to zero slope. The sampled magnitude thus obtained is affected by the time drifts of the system and is furthermore affected by the amplitude drifts of the system to the same degree as the magnitude of the first sample taken. The difference between the magnitudes of the waveform obtained during the two sampling times is stored, thereby providing a reference related solely to the timing of the system by which reference subsequently occurring time drifts may be compensated.

Prior to obtaining each subsequent sample of the waveform, samples thereof are obtained at the two reference sampling times and the difference is obtained between the magnitudes sampled thereat which difference is compared to the stored reference. The error signal provided thereby is thus related to the time drift of the system and is utilized to compensate the sampling time of the associated subsequent sample therefor. Each subsequent sample is compensated for amplitude drift by subtracting the magnitude of the waveform obtained at the associated zero slope reference sampling time from the magnitude obtained during the sampling time at which the subsequent sample was taken. The timing drift error signal obtained during a sampling cycle is also utilized to compensate the two reference sampling times of the next following sampling cycle.

BRIEF DESCRIPTION OF THE DRAWINGS

FIG. 2 is a schematic diagram, partially in block form, illustrating a preferred embodiment of the invention.

DESCRIPTION OF THE PREFERRED EMBODIMENT

Figure 1:
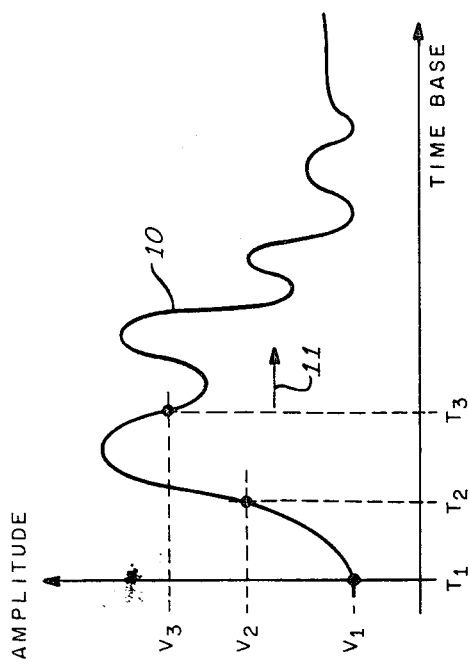
FIG. 1 is a graph illustrating a typical waveform to be measured or displayed in accordance with the present invention.

Referring to FIG. 1, a waveform 10 is illustrated, which is typical of the waveforms which may be measured or displayed in accordance with the present invention. The waveform 10 is subject to long term amplitude drifts which may cause the waveform 10 to move upwardly or downwardly with respect to the axes illustrated. The waveform 10 is also subject to timing drifts which may cause the waveform 10 to move rightwardly or leftwardly with respect to the axes illustrated. In accordance with the method of the present invention these amplitude and timing drifts are compensated by sampling the voltages $v_1$ and $V_2$ of the waveform 10 at the sampling times $T_1$ and $T_2$ respectively. It is appreciated that the voltage $V_1$ will vary as the waveform 10 moves vertically because of amplitude drift, but will be relatively unaffected as the waveform 10 move horizontally because of timing drifts. The insensitivity of the voltage $V_1$ to timing drifts occurs as a result of selecting the sampling time $T_1$ to occur at a portion of the waveform 10 so that has zero slope.

The sampling time $T_2$ is selected to occur at a portion of the waveform 10 having a relatively large slope. The slope chosen must be of nonzero magnitude and must be finite. It is appreciated, therefore, that the voltage $V_2$ will vary in the same manner as the voltage $v_1$ when the waveform 10 moves vertically because of amplitude drift and will additionally be affected as the waveform 10 moves horizontally because of timing drift.

At an initial time established with respect to the sampling procedure of the waveform 10, the voltages $V_1$ and $V_2$ are measured and the difference therebetween is stored. This initial difference between the voltages $V_2$ and $V_1$ may be designated as $(V_2-V_1)_0$. Since the voltage $V_2$ varies as a function of both the amplitude and time drifts and the voltage $V_1$ varies as a function of the amplitude drift alone, the quantity $(V_2-V_1)$ is representative solely of the timing drift of the system. The difference, therefore, between the quantity $(V_2-V_1)$, measured at a subsequent time with respect to the initail time, and the stored quantity $(V_2-V_1)_0$, is representative of the timing drift that has occurred between the initial time and the time the measurement was taken. A quantity related to this timing drift error may be combined with the sampling times $T_1$ and $T_2$ to thereby shift $T_1$ and $T_2$ back to the points on the waveform 10 which were originally sampled at the initial time, thereby compensating the sampling system for timing drift.

The points of the waveform $V_3$ are successively sampled at sampling time $T_3$, which sampling time is incrementally advanced from left to right across the waveform as indicated by the arrow 11. Prior to obtaining each of the $V_3$ samples, a measurement of the quantity $(V_2-V_1)$ is obtained and compared to the stored quantity $(V_2-V_1)_0$ and the error signal thereby obtained is utilized to compensate the position of the sampling time $T_3$. This timing drift error signal is also utilized to compensate the sampling times $T_1$ and $T_2$ of the next obtained timing reference samples. Thus, it may be appreciated that the timing of the sampling system is continuously adjusted to follow the rightwardly and leftwardly timing drifts of the waveform 10.

In order to compensate the samples $V_3$ for upward and downward amplitude drifts of the waveform 10, the voltage sample $V_1$ associated with a $V_3$ sample is subtracted therefrom providing a quantity designated as $(V_3-V_1)$. Since the voltage samples $V_1$ and $V_3$ vary to the same extent with respect to each other due to amplitude drifts of the waveform 10, the quantity $(V_3-V_1)$ represents a sample thereof compensated for amplitude drifts of the system.

Referring now to FIG. 2, a preferred embodiment of the apparatus utilized in practicing the invention is illustrated wherein a waveform to be measured or displayed is applied generally as an input to a conventional sampling oscilloscope 15. The sampling oscilloscope 15 includes a sampling gate 16 and a sample and hold circuit 18 which together comprises an oscilloscope sampling head 19. The sampling oscilloscope 15 further includes a time base unit 17, a sampling amplifier 20 and an oscilloscope main frame unit 21. The input waveform is applied to the sampling gate 16 which is enabled by a signal provided by the time base unit 17 in a manner to be explained. The output from the sampling gate 16 is applied as an input to the sample and hold circuit 18. The sample and hold circuit 18 is triggered by a signal provided by the time base unit 17 in a manner to be described. The sample and hold circuit 18 provides signals representative of the input waveform to the sampling amplifier 20. The sampling amplifier 20 provides the signals for the vertical deflection circuits of the oscilloscope main frame 21. The horizontal sweep signal, applied to the horizontal deflection circuits of the oscilloscope main frame 21, is provided by the time base unit 17 in a manner to be explained. The time base unit 17 additionally provides an unblanking signal to the intensifying circuits associated with the cathode-ray tube 42 of the oscilloscope main frame 21. The time base unit 17 generates a sampling waveform, illustrated by the timing waveform A of FIG. 3, which is synchronized to the input waveform via the "synch" input to the unit 17. The sampling waveform A provides a time base with respect to the input waveform 10 and is utilized in the time base unit 17 to provide triggering signals to the sampling gate 16 and the sample and hold circuit 18 in a manner to be explained. The sweep signal provided by the time base unit 17 to the oscilloscope main frame 21 is either generated internally thereby or is provided via an external sweep input thereto and is selectively controlled by an external-internal switch 22.

The sampling amplifier 20 of the oscilloscope 15 provides signals representative of the input waveform simultaneously to sample and hold circuits 51, 52 and 53. The sample and hold circuits 51, 52 and 53 are triggered by a trigger generator 24 via a three-position rotary switch 25 in a manner to be explained. It is to be appreciated that electronic switching circuits functionally equivalent to the rotary switch 25 may be substituted therefor. The output signals from the sample and hold circuits 51 and 52 are applied respectively to the inverting and noninverting inputs of an operational amplifier 26. The output signal from the amplifier 26, which signal is representative of the difference between the signals applied to the inputs thereof, is applied to the noninverting input of an operational amplifier 27. A source of DC potential 28 provides a variable DC voltage, via a potentiometer 29, to an inverting input of the amplifier 27. The output signal from the amplifier 27, which signal is representative of the difference between the signal from the amplifier 26 and the signal from the potentiometer 29 is, applied as an input to a multiplier 30. The multiplier 30 multiplies the signal from the amplifier 27 by a predetermined coefficient B. The output signal from the multiplier 30 is applied as the input to an integrator 31. The integrator 31 provides a feedback signal which is representative of the integrated error signal provided by the amplifier 27. The feedback signal from the integrator is selectively applied via a switch 32 to the inverting and noninverting inputs of an operational amplifier 33. The amplifier 33 and the switch 32 determine the polarity of the feedback signal in accordance with the slope of the input waveform 10 illustrated in FIG. 1 at the point $V_2$ thereof. The output of the amplifier 33 provides an input signal to an operational amplifier 34. The output of the amplifier 34, in turn, applied to the external sweep input of the time base unit 17 of the sampling oscilloscope 15 as previously explained.

The sample and hold circuits 51 and 53 provide signals to the inverting and noninverting inputs of an operational amplifier 35 respectively. The output of the amplifier 35 provides compensated output samples of the input waveform in a manner to be explained.

The circuit consisting of the subassemblies of the sampling oscilloscope 15, the sample and hold circuits 51 and 52, the amplifiers 26 and 27, the multiplier 30, the integrator 31, the switch 32 and the amplifiers 33 and 34, comprises a feedback loop for maintaining the sampling times $T_1$ and $T_2$ at predetermined points on the waveform 10 during a sampling procedure thereof in a manner to be explained.

Figure 3:
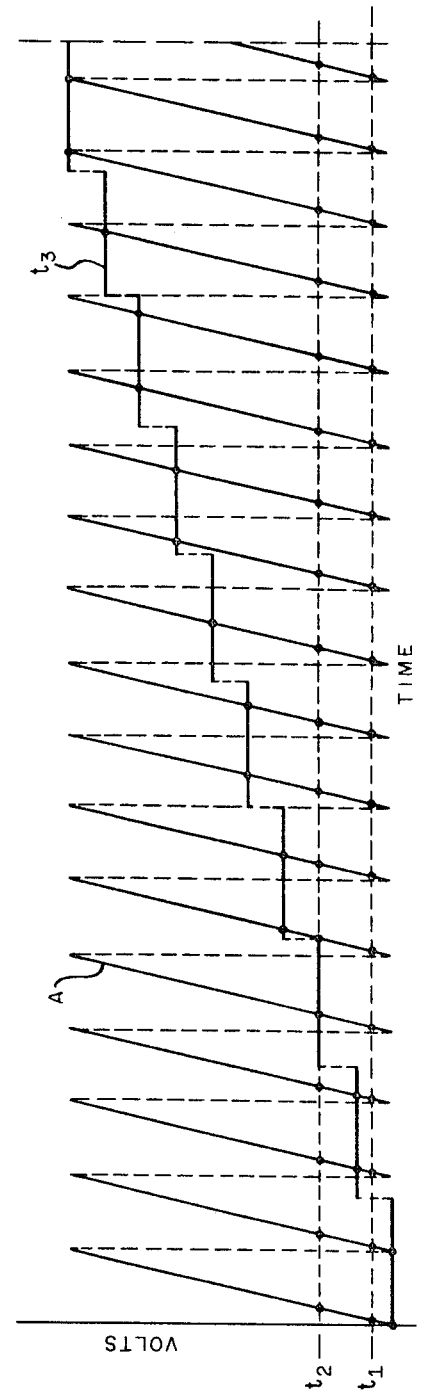
FIG. 3 is a waveform diagram illustrating signals useful in explaining the operation of the apparatus of FIG. 2.

Circuits are included in the apparatus of FIG. 2 for providing signals related to the control of the sampling times $T_1$, $T_2$ and $T_3$. A source of DC potential 36 provides variable sampling time positioning signals $t_1$ and $t_2$, as illustrated in FIG. 3, via potentiometers 37 and 38 respectively to electrical contacts 1 and 2 respectively of a three-position rotary switch 39. It is to be appreciated that electronic switching circuits functionally equivalent to the rotary switch 39 may be substituted therefor. The rotary switch 39 is coupled to the rotary switch 25, as well as to the trigger generator 24, to provide synchronous operation of the disclosed apparatus in a manner and for reasons to be explained. The trigger generator 24, as previously described, provides triggering signals to the sample and hold circuits 51, 52 and 53 and in addition provides incrementing signals to a counter 40 via electrical contact 2. The counter 40 may, for example, be a conventional binary pulse counter, the digital output of which provides the input signals to a digital-to-analog converter 41. The digital-to-analog converter 41 provides an analog signal $t_3$, which is illustrated in FIG. 3 to electrical contact 3 of the switch 39 in a manner and for reasons to be explained. The instantaneous value of the analog signal $t_3$ is representative of the instantaneous value of the digital count signal provided by the counter 40.

The wiper of the switch 39 sequentially couples the signals $t_1$, $t_2$ and $t_3$, thereby providing the external sweep input to the sampling oscilloscope 15 as previously described.

The apparatus illustrated in FIG. 2 is initially conditioned for operation by adjusting the potentiometers 29, 37, and 38; the coefficient B of the multiplier 30; the switch 32; and the counter 40 in accordance with the following procedure.

The sampling times $T_1$ and $T_2$ are first positioned with respect to the time base synchronized to the waveform 10 by adjusting the potentiometers 37 and 38, respectively. The potentiometers 37 and 38 may be adjusted by setting the external-internal switch 22 to the internal position. With the switch 22 in the internal position, the oscilloscope 15 will display the input waveform 10 on the cathode-ray tube 42 in the conventional operating manner of a sampling oscilloscope. Although the displayed waveform 10 may be contaminated by noise signals, the general shape thereof may be observed. Particularly, a portion of the waveform 10 having zero slope and a portion thereof having a slope of relatively large magnitude with respect to zero slope may be determined. With the switch 39 rotating in the direction of the arrow and with the external-internal switch 22 now set to the external position, three points of the waveform 10, indicated by $V_1$, $V_2$ and $V_3$ on FIG. 1 will be displayed on the cathode-ray tube 42 in a manner to be explained. The three points $V_1$, $V_2$ and $V_3$ correspond to the sampling times $T_1$, $T_2$ and $T_3$, respectively. The sampling times $T_1$, $T_2$ and $T_3$ are determined by the three voltages $t_1$, $t_2$ and $t_3$, respectively, in a manner to be discussed. The voltages $t_1$, $t_2$ and $t_3$ are provided by the potentiometers 37 and 38 and the digital-to-analog converter 41, respectively, as previously described.

It may now be observed that as the potentiometers 37 and 38 are adjusted, the respective sampling times $T_1$ and $T_2$ change correspondingly with respect to the time base and the respective points $V_1$ and $V_2$ move correspondingly along the waveform 10. Thus, by adjusting the potentiometer 37 so that the point $V_1$ is centered approximately on the previously observed portion of the waveform 10 having zero slope and by adjusting the potentiometer 38 so that the point $V_2$ is centered approximately on the previously observed portion of the waveform 10 having a relatively large slope, the sampling times $T_1$ and $T_2$ may be initially positioned with respect to the system time base in order to sample the two required reference points of waveform 10 as previously discussed.

The proper initial positioning of the sampling times $T_1$ and $T_2$ may be verified by alternating the position of the external-internal switch 22 between external and internal, thereby alternately displaying the waveform 10 and the three points $V_1$, $V_2$ and $V_3$ on the cathode-ray tube 42. It may thus be observed if the point $V_1$ is properly positioned on the portion of the waveform 10 having zero slope and if the point $V_2$ is properly positioned on the portion of the waveform 10 having a relatively large slope and appropriate adjustments made to the potentiometers 37 and 38 if they are not. Alternatively, the three points $V_1$, $V_2$ and $V_3$ may be examined simultaneously with the waveform 10 by alternating the position of the external-internal switch 22 at a sufficiently rapid rate so that the points and the waveform appear to be displayed simultaneously on the screen of the cathode-ray tube 42. The switch 22, therefore, may be comprised of electronic components.

The potentiometer 29 may now be adjusted thereby to store an initial reference value $(V_2-V_1)_0$ of the quantity $(V_2-V_1)$. In order so to set the potentiometer 29, the feedback loop previously described is open circuited, for example, by setting the coefficient B of the multiplier 30 to zero. With the external-internal switch 22 positioned to external and with the rotary switches 25 and 39 rotating in the direction of the arrows, the potentiometer 29 is adjusted until the voltage at the point X becomes zero. Since the output of the amplifier 26 is representative of the quantity $(V_2-V_1)$, and the output of the amplifier 27 is representative of the difference between its input signals, when the output of the amplifier 27 is zero, the voltage provided by the potentiometer 29 will be equal in magnitude to the voltage provided by the amplifier 26. Therefore, the voltage provided by the potentiometer 29 is representative of the quantity $(V_2-V_1)$ at the initial time at which the adjustment thereto is made, which quantity is designated as $(V_2-V_1)_0$.

The switch 32 may now be adjusted in accordance with the slope of that portion of the waveform 10 on which the point $V_2$ had been positioned. If the slope thereof is positive, the switch 32 is set to the positive slope position thereby providing a feedback signal from the amplifier 33 whose polarity is not inverted. If, however, the slope of the portion of the waveform 10 on which $V_2$ had been positioned has a negative slope, the switch 32 is set to the negative slope position thereby providing a feedback signal from the amplifier 33 whose polarity is inverted.

The coefficient B of the multiplier 30 may now be adjusted to its initail condition. As previously described, the circuit in which the multiplier 30 is included comprises a feedback loop. It is understood that the coefficient B must be adjusted so that the feedback loop gain does not exceed unity thereby to preclude oscillation of the system. Additionally, the feedback loop gain should be as large as possible, although not exceeding unity, so that the loop may provide as rapid a response as possible. Ideally, the coefficient B should be adjusted so that the feedback loop gain is precisely unity. With the external-internal switch 22 positioned to external and the switches 25 and 39 rotating in the direction of the arrows, the coefficient B of the multiplier 30 may be set to its initail condition. In order so to set the coefficient B, a square wave potential may be superimposed across the potentiometer 29 and the resultant waveform at the point Y observed on an auxiliary oscilloscope, not shown. The coefficient B may be adjusted so that the observed waveform has as fast a rise time as possible without overshoot. Under this condition, the coefficient B of the multiplier 30 will be properly adjusted.

The counter 40 may now be preset to an initail value in accordance with the initail point of the waveform 10 to be sampled. With the external-internal switch 22 set to the external position and the switch 39 set to position 3, the counter 40 may be preset, in any convenient manner, to a number so that the digital-to-analog converter 41 provides a voltage $t_3$ to properly position the initial point of the waveform 10 to be sampled.

In order to understand the operation of the apparatus illustrated in FIG. 2, it will first be necessary to describe the operation of the circuits of the sampling oscilloscope 15. The time base unit 17 generates a sawtooth waveform of the shape illustrated by waveform A of FIG. 3. The cycles of the waveform A are synchronized in a conventional manner to the cycles of the repetitive input waveform 10 by means of the "synch" input to the time base unit 17. The waveform A therefore provides a time base for the system with respect to the input waveform 10. With the external-internal switch 22 set to the internal position, the time base unit 17 generates a slowly increasing ramp voltage, not illustrated. The slowly increasing ramp voltage is combined in the time base unit 17 with the waveform A so that a trigger pulse is provided to the sampling head 19 whenever the waveform A intersects the slowly increasing ramp. The trigger pulses thus provided are utilized to trigger the sampling gate 16 and the sample and hold circuit 18. Thus, at each occurrence of a trigger pulse, the sampling gate 16 transmits a sample of the input waveform to the sample and hold circuit 18 wherein the sample is held until the next occurring sample is obtained. Since the waveform A, which is synchronized to the input waveform coacts with the slowly increasing ramp voltage as explained, the samples obtained by the sampling gate 16 progress slowly across a cycle of the repetitive input waveform.

The samples held in the sample and hold circuit 18 are provided via the sampling amplifier 20 to the vertical deflection circuits of the main frame 21. The slowly increasing ramp voltage, generated by the time base unit 17, provides the horizontal sweep deflection signals to the main frame 21. The trigger pulses provided by the time base unit 17 are also applied to the grid electrode of the cathode-ray tube 42 thereby to provide unblanking signals for the electron beam. Thus, successively occurring samples obtained across a cycle of the input waveform 10 is displayed on the cathode-ray tube 42 thereby manifesting the shape thereof.

The sampling amplifier 20 may include an integration function for smoothing the sampled signals provided thereto by the sample and hold circuit 18, thus, providing reduction in random noise fluctuations of the input waveform 10.

For purposes of illustration, the operation of the apparatus disclosed in FIG. 2 will now be described with respect to the input waveform 10 of FIG. 1. After the apparatus has been initially conditioned for operation by adjusting the components thereof as previously described, the device may provide an output signal via the amplifier 35 which signal is representative of the sampled input waveform 10 compensated for the amplitude and time drifts of the system. With the external-internal switch 22 positioned to external, the voltages $t_1$, $t_2$ and $t_3$ as illustrated in FIG. 3 are supplied by the amplifier 34 and provided to the time base unit 17 to replace the internally generated slowly increasing horizontal sweep ramp signal previously described. With the rotary switches 25 and 39 rotating in synchronism in the direction of the arrows, the waveform 10 is sampled in the direction of the arrow 11 beginning at the amplitude axis of FIG. 1.

When the switches 25 and 39 are positioned at their respective contacts 1, the voltage $t_1$ is applied via the amplifier 34 to the time base unit 17. The time base waveform A intersects the voltage $t_1$ as illustrated in FIG. 3, providing the trigger pulses to the sampling head 19 corresponding to the sampling time $T_1$ in the manner previously described. Consequently, the sampling amplifier 20 provides the voltage sampled at sampling time $T_1$ to the sample and hold circuits 51, 52 and 53. A trigger pulse from the trigger pulse generator 24 enables the sample and hold circuit 51 via the contact 1 of the switch 25 thereby to store the sample obtained. The trigger generator 24 is coupled to the rotary switches 25 and 39, as indicated by the dashed lines, to provide a trigger pulse to the electrical contacts 1, 2 or 3, respectively, of the switch 25 just prior to the time that the wiper of the switch 39 breaks electrical contact with the respective contacts 1, 2 or 3 of the switch 39.

The time interval during which the wiper of the switch 39 connects to the contact 1 thereof determines the number of cycles of the time base waveform A that intersect the voltage $t_1$. The time interval that the wiper of the switch 39 connects to the contact 1 is dependent upon the rate of rotation of the switch 39. Therefor, the rate of rotation of the wiper of the switch 39 determines the number of samples obtained by the sampling gate 16 at the sampling time $T_1$, thus determining the extent of the integration performed by the sampling amplifier 20 on the noise signals distorting the waveform 10 at the sampling time $T_1$.

With the rotary switches 25 and 39 now positioned to their respective contacts 2, the voltage $t_2$ is applied to the time base unit 17 via the amplifier 34 which voltage is illustrated in FIG. 3. In the manner described with respect to position 1 of the rotary switches 25 and 39, the sampling gate 16 provides samples of the waveform 10 obtained at sampling time $T_2$ to the sampling amplifier 20 via the sample and hold circuit 18. The sampled voltage provided by the sampling amplifier 20 is entered into the sample and hold circuit 52 by means of a trigger pulse from the trigger generator 24 via the contact 2 of the switch 25. This pulse from the trigger generator 24 is also utilized to increment the counter 40 by one count for a reason to be explained.

It is appreciated that the longer a point of the waveform 10 is sampled at a particular sampling time, the greater will be the signal enhancement due to the integration function of the sampling amplifier 20. Therefore, the longer the switch 39 dwells at the positions thereof, the better will be the noise cancellation in the system. It is to be understood, however, that the rate of rotation of the switch 39 must be chosen sufficiently rapid so that the system experiences negligible amplitude and time drifts during one rotation thereof. It may also be appreciated that for further signal enhancement, low-pass filtering circuits may be interposed between the sampling amplifier 20 and the sample and hold circuits 51, 52 and 53.

The voltages sampled at the sampling times $T_1$ and $T_2$ and held respectively in the sample and hold circuits 51 and 52 are applied to the amplifier 26 wherein the difference therebetween, $(V_2-V_1)$, is obtained. The amplifier 27, in turn, provides the difference between the quantity $(V_2-V_1)$ and the previously stored quantity $(V_2-V_1)_0$ provided by the potentiometer 29. The error signal provided by the amplifier 27 is multiplied in the multiplier 30 by the coefficient B and thereafter applied to the integrator 31. The integrator 31 provides a feedback signal to the amplifier 34, the polarity of which signal is adjusted by the switch 32 and the amplifier 33 in accordance with the slope of the waveform 10 at sampling time $T_2$ as previously described. If the timing of the system has not changed since the time at which the potentiometer 29 was initially adjusted, the feedback signal applied to the amplifier 34 will be of zero magnitude. If, however, the timing of the system has drifted since the initial adjustment of the potentiometer 29, the magnitude of the feedback signal will be representative of the magnitude of the timing drift and the polarity of the feedback signal will be representative of the direction thereof.

With the rotary switches 25 and 39 now positioned to their respective contacts 3, the voltage $t_3$ which is determinant of the sampling time $T_3$, is applied to the amplifier 34. The amplifier 34 combines the feedback signal provided by the integrator 31 with the voltage $t_3$ thereby compensating the sampling time $T_3$ for the timing drift of the system. The voltage sampled by the sampling circuits of the sampling oscilloscope 15 at the sampling time $T_3$ is entered into the sample and hold circuit 53 by means of a trigger pulse from the trigger generator 24 via position 3 of the switch 25. Since any amplitude drift suffered by the system has affected both the voltages $V_1$ and $V_2$ held respectively in the sample and hold circuits 51 and 53 to the same degree, the quantity $(V_3-V_1)$ provided by the amplifier 35 is representative of a sample of the waveform 10 obtained at a sampling time $T_3$ with respect to the time base of the system and compensated for both amplitude and timing drifts thereof.

As the rotary switches 25 and 39 continue to rotate in the direction of the arrows, repeatedly resampling the waveform 10 at the reference sampling times $T_1$ and $T_2$, the feedback signal provided by the integrator 31 to the amplifier 34 continually adjusts the sampling times $T_1$ and $T_2$, thereby maintaining the timing of the system constant with respect to the waveform 10 in accordance with the initial timing condition, $(V_2-V_1)_0$, as initially established. Furthermore, as the rotary switches 25 and 39 continue to rotate in the direction of the arrows, the error signal provided by the amplifier 27 continuously adjusts the feedback signal via the integrator 31 thereby to continuously compensate the system for timing drift thereof thus maintaining the timing of the system time base constant with respect to the waveform 10.

As the rotary switch 25 continuously rotates in the direction of the arrow, the pulses from the trigger generator 24 continuously increment the count in the counter via the contact 2 of the switch 25. As the count in the counter incrementally increases, the digital-to-analog converter 41 coupled thereto, provides the staircase-shaped voltage $t_3$ illustrated in FIG. 3. Therefore, in the manner previously described, the sampling time $T_3$ is incrementally positioned across the waveform 10 in the direction of the arrow 11 as indicated in FIG. 1. The counter 40 may be internally connected in a conventional manner to reset back to its initially preset condition after attaining a predetermined count. The predetermined count may be selected so to cause the sampling time $T_3$ to reach a predetermined end point of the cycle of the waveform 10 when the counter 40 is preset back to its initial condition.

It is therefore appreciated from the foregoing description that each sample of the waveform 10 obtained at the sampling time $T_3$ is preceded by two samplings of the waveform 10 at the reference sampling times $T_1$ and $T_2$. Thus, the positioning of the sampling times $T_1$, $T_2$ and $T_3$ with respect to the waveform 10 are continuously compensated for the timing drifts of the system thereby effectively locking the time base of the system to the waveform 10. It is furthermore appreciated that the samples of the waveform 10 obtained at the sampling times $T_3$ are compensated for amplitude drift of the system by means of the subtraction performed by the amplifier 35.

It will therefore be appreciated that a slow scan of the repetitive input waveform 10 may be obtained with the timing of the system remaining locked thereto by, for example, positioning the sampling time $T_3$ across the waveform 10 through very small increments. Small increments of the sampling time $T_3$ may be obtained by an appropriate voltage adjustment to the digital-to-analog converter 41 with respect to the digital increments provided by the counter 40. The random short term fluctuations of the waveform 10 may thus efficaciously be reduced to zero by a conventional continuous integrator (not shown) having a long time constant which integrator may be connected to the output of the amplifier 35.

Alternatively, numerous scans of the repetitive waveform 10 may be obtained and the samples thereof provided by the amplifier 35 being stored, for example, in a digital computer. The computer may thereafter provide the average value for each sampled point on the waveform, the average being taken with respect to the total number of scans obtained. In this manner, the random short term fluctuations of the waveform 10 may effectively be reduced to zero.

The present invention embodied in the apparatus hereindescribed may find utility in a wide variety of applications. For example, it may be desired to perform a computer analysis of a high frequency repetitive waveform having an unfavorable signal to noise ratio. Compensated samples of the input waveform may be obtained during a slow scan thereof which samples may be provided by a continuous integrator connected to the output of the amplifier 35 as discussed above. The compensated samples thus obtained may be applied thereafter as an input to a digital computer via an analog-to-digital converter for purposes of computer analysis. Alternatively, numerous scans of the input waveform may be obtained and the samples thereof provided by the amplifier 35 applied as an input to the digital computer via an analog-to-digital converter. The computer may obtain the point by point average of the scans thereby enhancing the signal to noise ratio of the input signal before performing the computer analysis thereof.

As a further example of an application for the present invention, it is appreciated that the circuits thereof may be incorporated into the conventional sampling oscilloscope thereby providing an improved instrument for displaying high frequency wave forms having low signal to noise ratios whose wave shapes could heretofore only be approximately determined on the display thereof.

Although the present invention may be embodied by the apparatus as set forth hereinabove, other embodiments within the scope of the invention may be provided. For example, a stored program digital computer may be appropriately programmed to perform the method of the present invention. The computer may be adapted to insert binary numbers into first and second registers connected to the output thereof. The first register may be caused by the computer to sequentially contain binary numbers representative of the voltages $t_1$, $t_2$ and $t_3$ respectively and the second register may be caused by the computer to hold binary numbers representative of the feedback signal. Two digital-to-analog converters may be coupled to the outputs of the two registers, respectively, the outputs of which converters may in turn be combined by an operational amplifier. The output of the operational amplifier may be connected to the external sweep input of the time base unit 17 of the sampling oscilloscope 15. The sampling amplifier 20 may provide the sampled magnitudes of the input waveform 10 to an input of the digital computer via an analog-to-digital converter. The computer may be appropriately programmed to perform the calculations described hereinabove with respect to the method of the present invention.

While the invention has been described in its preferred embodiments, it is to be understood that the words which have been used are words of description rather than limitation and that changes may be made without departing from the true scope and spirit of the invention in its broader aspects.

I claim:

1. Apparatus for compensating amplitude and time drifts in sampled waveform systems having a time base established with respect to said waveform, said apparatus comprising
   first, second and third sampling means responsive to said waveform for providing samples of the magnitude of said waveform at first, second and third sampling times with respect to said time base, respectively,
   first subtraction means responsive to said first and second sampling means for providing a first signal representative of the difference between said magnitudes sampled at said first and second sampling times,
   reference means for storing an initail value of said first signal,
   second subtraction means responsive to said first subtraction means and said reference means for providing an error signal representative of the difference between said first signal and said stored initial value thereof,
   adjusting means responsive to said second subtraction means for adjusting said first, second and third sampling times, in accordance with said error signal, and
   third subtraction means responsive to said first and third sampling means for providing a signal representative of the difference between said magnitudes sampled at said first and third adjusted sampling times thereby providing a signal representative of a compensated sample of said waveform.

2. Apparatus of the character recited in claim 1 further including first, second and third positioning means for providing first, second and third positioning signals respectively whose respective coactions with said time base provide signals determinant respectively of said first, second and third sampling times with respect to said time base.

3. Apparatus of the character recited in claim 2 further including
   switching means for sequentially coupling said first, second and third positioning signals into coaction with said time base, and
   triggering means synchronized with said switching means for sequentially providing actuating trigger signals to said first, second and third sampling means respectively.

4. Apparatus of the character recited in claim 2 further including means for incrementing said third positioning signal thereby to provide adjacent samples of said waveform.

5. Apparatus of the character recited in claim 2 in which said adjusting means includes
   integrating means responsive to said error signal for integrating said error signal thereby providing a feedback signal, and
   combining means responsive to said feedback signal and said positioning signals for combining said feedback signal with said positioning signals thereby to reduce said error signal.

6. Apparatus of the character recited in claim 5 in which said adjusting means further includes inverting means for selectively inverting the polarity of said feedback signal in accordance with the polarity of the slope of said waveform at said second sampling time.

7. A method for compensating amplitude and time drifts in sampled waveform systems having a time base with respect to said waveform, said method comprising the steps of sampling the magnitude of said waveform at a first sampling time with respect to said time base,
   sampling the magnitude of said waveform at a second sampling time with respect to said time base,
   obtaining the difference between said magnitudes sampled at said first and second sampling times respectively thereby providing a first signal representative of the difference therebetween,
   resampling the magnitudes of said waveform at said first and second sampling times, respectively, obtaining the difference between said magnitude resampled at said first and second sampling times, respectively, thereby providing a second signal representative of the difference therebetween,
   obtaining the difference between said first and second signals thereby providing an error signal representative of the difference therebetween,
   generating a feedback signal in accordance with said error signal, sampling the magnitude of said waveform at a third sampling time with respect to said time base, said third sampling time being adjusted in accordance with said feedback signal, and
   obtaining the difference between said magnitude sampled at said third sampling time and said magnitude resampled at said first sampling time thereby providing a first compensated sample of said waveform.

8. A method of the character recited in claim 7 further including the steps of
   sampling the magnitudes of said waveform at adjusted first and second sampling times, respectively,
   said first and second sampling times being adjusted in accordance with said feedback signal, obtaining the difference between said magnitudes sampled at said adjusted first and second sampling times respectively thereby providing a new second signal representative of the difference therebetween, obtaining the difference between said first signal and said new second signal thereby providing a new error signal representative of the difference therebetween, combining said new error signal with said feedback signal, sampling the magnitude of said waveform at a fourth sampling time with respect to said time base, said fourth sampling time being adjusted in accordance with said feedback signal, and obtaining the difference between said magnitude sampled at said fourth sampling time and said magnitude sampled at said adjusted first sampling time thereby providing a second compensated sample of said waveform.

9. A method of the character recited in claim 7 in which said step of sampling the magnitude of said waveform at a first sampling time includes the step of selecting said first sampling time whereby said waveform is sampled on a portion thereof having a slope of small magnitude, and said step of sampling the magnitude of said waveform at a second sampling time includes the step of selecting said second sampling time whereby said waveform is sampled on a portion thereof having a slope of large magnitude with respect to said slope of small magnitude.

10. A method of the character recited in claim 9 in which said step of selecting said first sampling time comprises the step of selecting said first sampling time whereby said waveform is sampled on a portion thereof having a slope of zero magnitude.

11. A method of the character recited in claim 8 in which said step of sampling the magnitudes of said waveform at adjusted first and second sampling times comprises the step of sampling the magnitudes of said waveform at adjusted first second sampling times respectively wherein said first and second sampling times are adjusted thereby to reduce said new error signal.

12. A method of the character recited in claim 7 in which said step of generating a feedback signal comprises the step of integrating said error signal thereby providing said feedback signal.